Feb. 24, 1970  H. RUHL  3,496,815
METHOD AND APPARATUS OF MAKING PLASTIC APRONS
Filed March 22, 1968
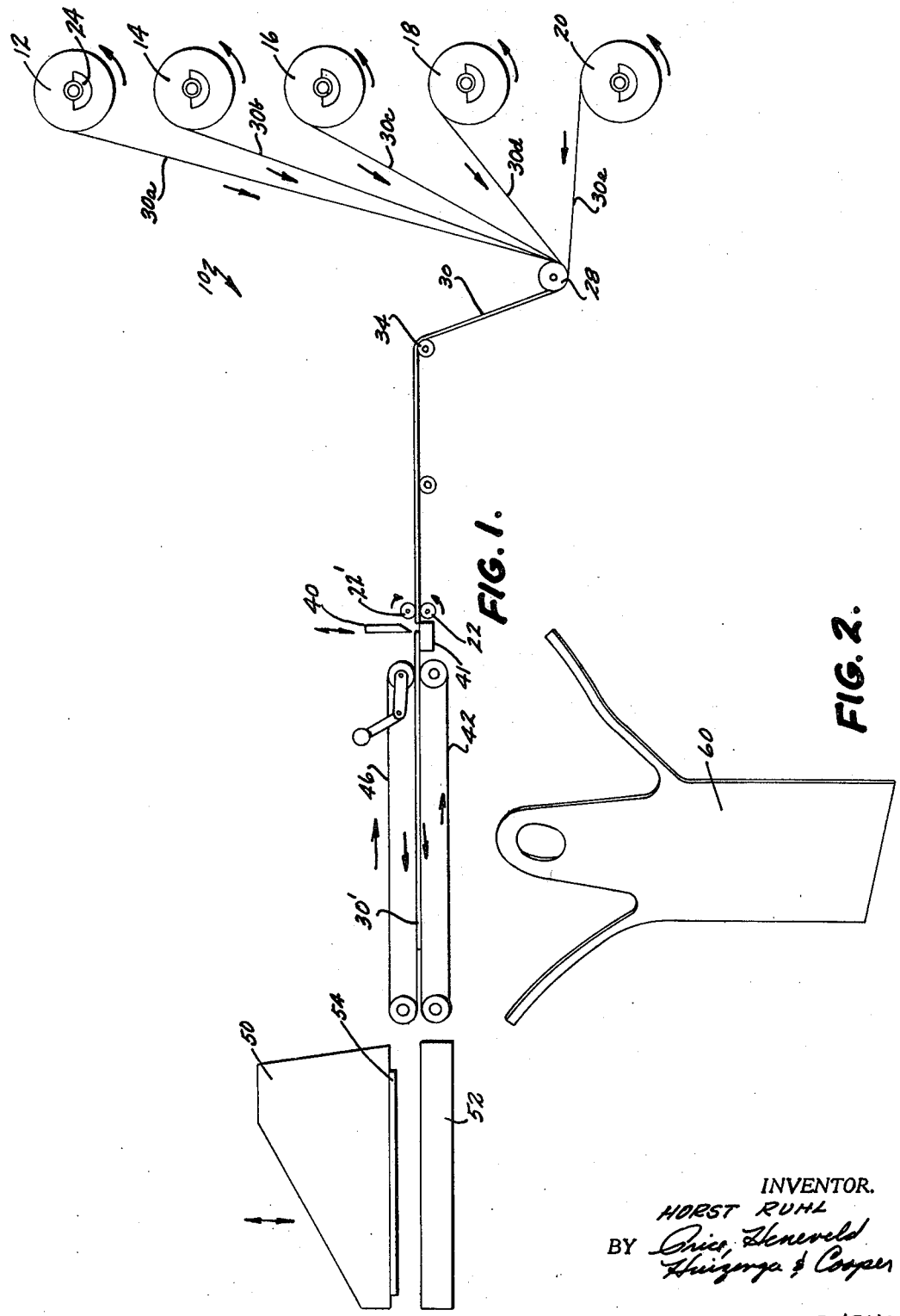
INVENTOR.
HORST RUHL
BY Price, Heneveld,
Huizenga & Cooper
ATTORNEYS United States Patent Office 3,496,815
Patented Feb. 24, 1970.

3,496,815
METHOD AND APPARATUS OF MAKING PLASTIC APRONS
Horst Ruhl, Wyoming, Mich., assignor to H & H Plastics Mfg. Co., Grand Rapids, Mich., a corporation of Michigan
Filed Mar. 22, 1968, Ser. No. 715,309
Int. Cl. B26d 7/06
U.S. Cl. 83—29                              2 Claims

ABSTRACT OF THE DISCLOSURE

This specification discloses a method of mass producing disposable configurated plastic aprons by placing continuously a plurality of individual electrostatically charged plastic webs into overlying face to face relation while advancing them from separate supply sources, severing a selected length of stock simultaneously from all of the overlying webs to form a multiple web portion, then advancing the mutually clinging severed multiple web portion as a body by applying advancing force to the outermost webs, and die cutting said multiple body into configurated like aprons.

Background of the invention

This invention relates to disposable configurated plastic aprons, and more particularly to a method of mass producing such in high speed economical manner.

The concept of manufacturing bibs from plastic film stock normally involves the performance of various folding, slitting, severing, and heat sealing steps on successive portions of a layer of plastic film stock that is pulled from a roll. Although the cost of manufacturing such items is relatively low in view of the unique nature of the product obtained, still it is significant. Moreover, in periods of great demand for the items, manufacturers such as the assignee herein have some difficulty in meeting the demand because the rate of web travel through the conventional system is limited, and each system requires a substantial amount of space and equipment expense. Hence, unless the manufacturer installs additional costly equipment which may be idle during slack periods, there is a limit to practical production output of the present systems.

Summary of the invention

It is an object of this invention to provide a novel system or method of mass producing configurated disposable plastic aprons from web stock, having substantial versatility of production output, to enable the manufacturer to meet varying product demands.

Another object of this invention is to provide a novel method of producing such items in selected multiples. The production system is not limited in its output to the rate of advancement of a single web, as previously, but rather, utilizes the electrostatic characteristics of plastic web stock in a special manner to effectuate large but variable production output. The individual webs are put into mutual relationship in a manner to enable controlled advancement of many web portions for severance of web therefrom, and then the web sections advanced as a body by contact of the advancing means with only the outermost web layers, and then all web sections are simultaneously die cut with an apron configuration to obtain a plurality of individual separable aprons.

These and other objects of this invention will be apparent from the following specification and drawings.

Brief description of the drawings

FIG. 1 is a side elevational schematic view of the novel system and method; and

FIG. 2 is an elevational view of a plastic disposable apron formed by the novel method.

Description of the preferred embodiment

The invention basically centers around the method illustrated in FIG. 1, for mass producing plastic disposable aprons illustrated in FIG. 2. The plastic web stock may be of any suitable plastic material such as polyethylene, PVC or the like, normally of a few mils thickness. Such web stock is normally in a generally endless web form having a width of a few feet or so, and wound on rolls, e.g. rolls 12, 14, 16, 18 and 20 illustrated in the apparatus 10 in FIG. 1. The central core members of these rolls are mounted on support bearings 24 so that the rolls can be unwound when the web stock is pulled by a pair of feed rolls 22 and 22′.

The plurality of individual webs, here shown to be five in number, but which may vary in number, are advanced from the separate supply rolls in a convergent path toward a guide element 28 that has surface area against which all of the individual webs 30a, 30b, 30c, 30d, and 30e are brought into mutual overlapping engagement. The individual webs possess an electrostatic charge on their surfaces because of the nature of these materials. These webs are joined into an overlapping laminate 30 in which the individual webs cling in coextensive fashion to each other. This combined multiweb laminate is pulled from guide 28 in a different direction than the direction of any of the webs toward roll 28 so that these webs are pulled into tight relationship for maximum "clinging" action between the webs as a result of the electrostatic charge thereon. The combined webs are then further advanced over guide rollers 34 and 36 to pull mating feed rolls 22 and 22′.

Immediately downstream of feed rolls 22 and 22′ is a transverse, cut-off knife 40 which simultaneously severs the plurality of webs against support 41.

Feed rolls 22 and 22′ are driven intermittently, so that a pre-determined length of the combined multiple web body is advanced between upper and lower conveyor belts 46 and 42, and severed. The severed sections of web stock act as a unitary body 30′ which is advanced by engagement of upper endless belt 46 with the upper web layer, and engagement of lower endless belt 46 with the lower web layer. Yet, even with only this engagement, the plurality of flexible webs are advanced in completely aligned relationship with each other, i.e. without the upper or lower layers advancing beyond the others, because of the temporary bonding interrelationship between the charged clinging layers to cause them to have a mutual-philic relationship. These belt means advance the multilayer body 30′ toward the bed of the reciprocating die press which includes a vertically reciprocable upper platen 50 and lower platen 52. The upper platen includes a die cutting blade 54 which has a configuration of apron 60 in FIG. 2. With reciprocation of platen 50 and knife 54, all of the plurality of layers in the body 30′ are simultaneously die cut to this configuration. The resulting multilayer product can be conveniently separated into individual aprons immediately after the die cutting operation, or after shipment in the mutual clinging relationship.

It will be realized that any reasonable number of web layers may be used instead of the specific number of five illustrated, without departing from the concept. It is also conceivable that certain equipment variations could be employde in the system without departing from the basic concept presented. Hence, the invention is intended to be limited only by the scope of the appended claims.

The embodiments of the invention in which an exclusive property or privilege is claimed are defined as follows:

1. A method of mass producing disposable plastic aprons from plastic film stock comprising the steps of: repeatedly advancing a plurality of at least three individual elongated separate webs of plastic film stock over guide surface means while changing the direction of travel of the films as they pass said guide surface means to cause said webs to engage and electrostatically cling together; repeatedly severing a selected length of stock from all of said engaged, clinging webs simultaneously, thereby repeatedly creating a severed body of mutual-philic films; advancing said body as a unit to a die-cutting support surface by engagement of recirculating feed means against only the outermost of said films; and die cutting the configuration of an apron through said entire body to simultaneously form a plurality of individual separable aprons.

2. Apparatus for producing configurated plastic aprons from web stock comprising: a plurality of at least three adjacent web roll supports for rotationally supporting individual rolls of plastic web stock thereon; revolving web advancing rolls spaced from said supports and arranged to engage only the outermost of the webs; web guide surface means located to receive a plurality of individual webs from said rolls on said supports, combine them into a mutual-philic overlapping laminate, and direct the combined laminate to said advancing rolls; web severance means downstream of said advancing rolls for severing segments of said laminate into multiple bodies; recirculating body conveying means positioned to receive said bodies and engage only the outermost of said webs; and apron configurated die cutting means for substantially simultaneously cutting configurated items into all web layers of each body.

References Cited

UNITED STATES PATENTS

| | | | |
|---|---|---|---|
| 847,536 | 3/1907 | Zimmerman | 83—650 X |
| 1,844,201 | 2/1932 | Budny | 2—243 |
| 2,066,566 | 1/1937 | Janson et al. | 83—29 |
| 3,054,708 | 9/1962 | Steinberg | 156—1 |
| 3,146,465 | 9/1964 | Hummel | 2—49 |
| 3,221,341 | 12/1965 | Hummel | 2—49 |
| 3,350,247 | 10/1967 | Steinberg | 156—1 |
| 3,397,826 | 8/1968 | Hawley et al. | 83—29 X |

ALFRED R. GUEST, Primary Examiner

U.S. Cl. X.R.

2—48; 83—650, 925